Figure 9:
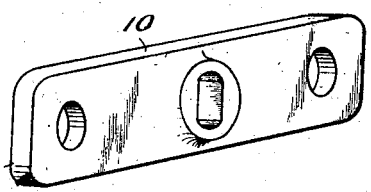

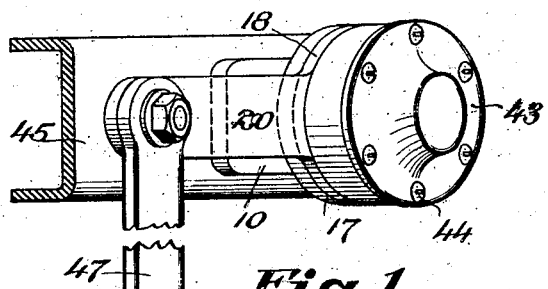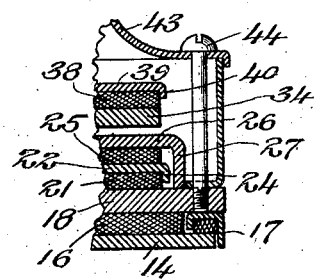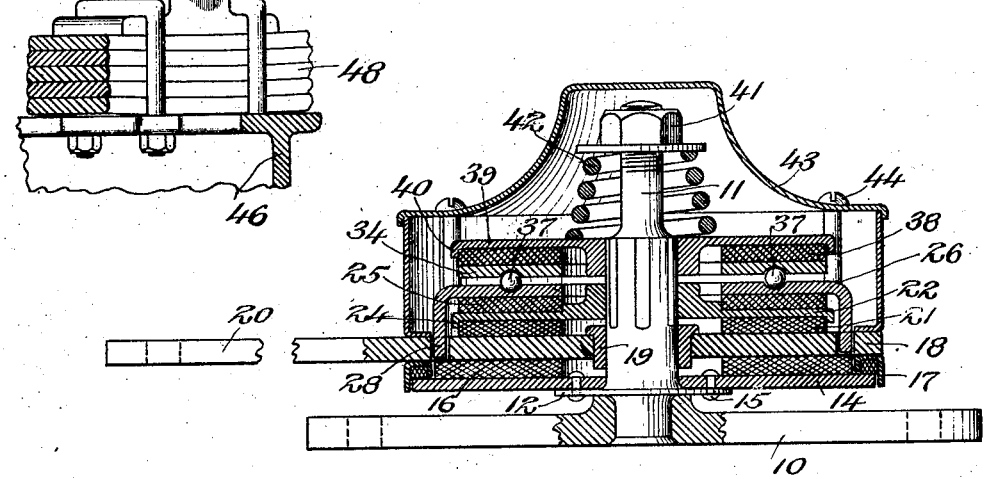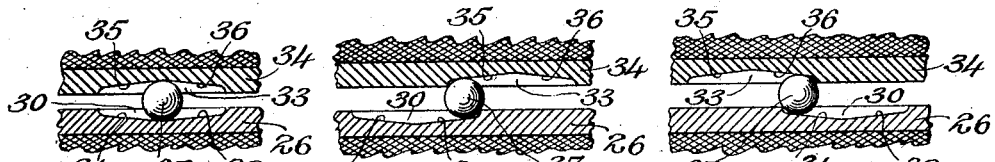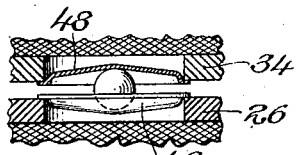

Aug. 26, 1930. E. J. GULICK 1,774,094
SHOCK ABSORBER
Filed Feb. 1, 1929 2 Sheets-Sheet 2

Inventor
Edward J. Gulick
By Louis C. Vanderlip.
Attorney

Patented Aug. 26, 1930

1,774,094

UNITED STATES PATENT OFFICE

EDWARD J. GULICK, OF ELKHART, INDIANA

SHOCK ABSORBER

Application filed February 1, 1929. Serial No. 336,718.

My invention relates to improvements in shock absorbers of the friction type, especially adapted for use in association with the suspension springs of vehicles, and my purpose, generally speaking, is to provide a shock absorber which will act both to buff compressive movements and to check rebound movements of a suspension spring with increasing intensity as the amount of said movements increase.

More particularly it is my purpose to provide a shock absorber of the foregoing type which is readily adjustable for cooperation with springs of different strengths, and which is inclusive of safety means insuring it against injury or breakage in the event the parts thereof are subjected to unusual movements.

Also it is my purpose to provide a shock absorber having the features mentioned which is of simple, compact and inexpensive construction, strong, durable, and thoroughly reliable and efficient in operation.

With the foregoing and other purposes in view, my invention consists in the novel features of construction, combination and arrangement of parts as will be hereinafter more fully described, illustrated in the accompanying drawings and defined in the appended claims.

In the drawings, wherein like characters of reference denote corresponding parts in the different views:—

Figure 10:
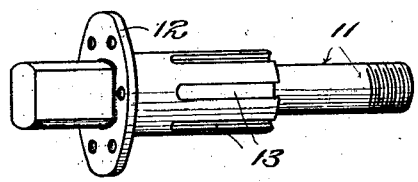
Figure 11:
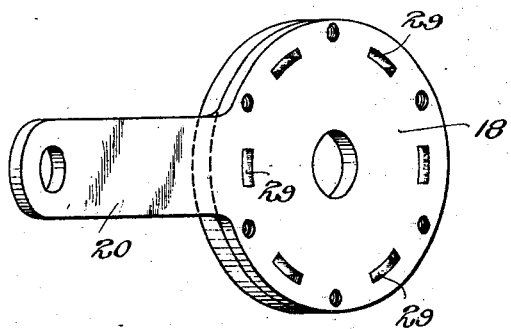
Figure 12:
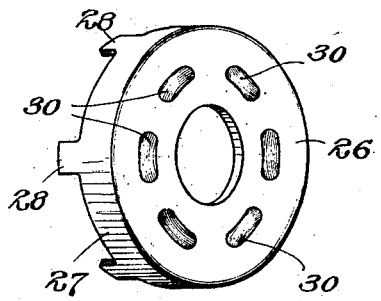
Figure 13:
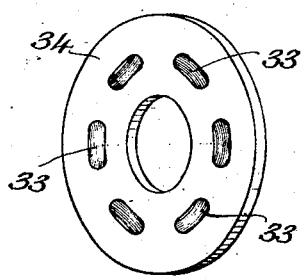
Figure 14:
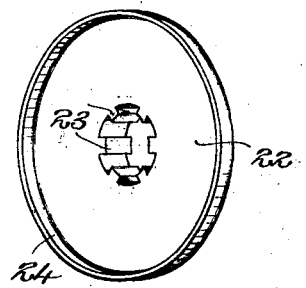
Figure 15:
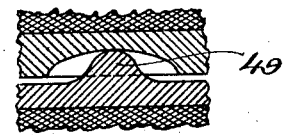
Figure 16:
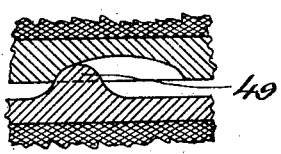

Figure 1 is a perspective view showing one manner of mounting my improved shock absorber for cooperation with a suspension spring of a motor vehicle;

Figure 2, a horizontal sectional view taken centrally through my improved shock absorber;

Figure 3, a fragmentary sectional view similar to Figure 2 taken on a plane at an angle to the plane of Figure 2;

Figure 4, a detail sectional view showing the cooperating cam and cam follower elements of my shock absorber in normal or neutral position;

Figure 5, a view similar to Figure 4 showing the cam carrying elements in their extreme position of relative movement in one direction;

Figure 6, a view similar to Figures 4 and 5 showing the cam carrying elements in their extreme position of relative movement in an opposite direction;

Figure 7, a view similar to Figures 4, 5 and 6 showing a slight modification wherein the cam surfaces are formed on members removable from the elements which carry them;

Figure 8, an elevation of one of the removable cam members shown in Figure 7;

Figure 9, a perspective view of the base element or mounting plate of my improved shock absorber;

Figure 10, a perspective view of the stud on which the cooperating friction elements of my improved shock absorber are mounted for movement;

Figure 11, a perspective view of the lever element of my improved shock absorber;

Figure 12, a perspective view of one of the cam carrying elements of my improved shock absorber;

Figure 13, a perspective view of the other cam carrying element;

Figure 14, a perspective view of one of the friction disks of my improved shock absorber; and Figures 15 and 16, detail views similar to Figures 4 to 7 showing a further slight modification wherein the cam follower elements are formed integrally with their related friction disk.

Referring now to the drawings in detail, 10 designates a base or mounting plate carrying, rigid therewith, a stud 11 which is threaded at its outer end, provided near its inner end with an annular flange 12 and formed, intermediate its ends, with a series of longitudinally extending key-ways or grooves 13.

Seated against the flange 12 is a stiff, preferably metallic, plate or disk 14 secured rigidly with respect to the stud 11 by means of rivets or other suitable fasteners 15 passed therethrough and through said flange. Against the outer face of this disk is positioned a friction ring 16 formed from any suitable material such as that usually employed for brake lining purposes, said ring having suitably attached thereto a dust guard 17 which overlies the edge of disk 14 and is designed to prevent foreign matter from entering between said disk and ring.

Against the outer face of ring 16 is positioned a stiff, preferably metallic plate or disk 18, this disk, unlike disk 14, being mounted on the stud 11 for both rotary and longitudinal movements relative thereto, a bushing 19 preferably but not necessarily being interposed between said disk and said stud and a lever arm 20 being formed on said disk for effecting rotation thereof.

Against the outer face of disk 18 is positioned a friction ring 21 formed preferably from the same material as ring 16, and against the outer face of this ring 21 is positioned a stiff, preferably metallic, plate or disk 22 which is mounted on the stud 11 for sliding movement longitudinally thereof, but is held against rotation relative thereto by teeth 23 thereon which engage in the keyways or grooves 13, said disk having a marginal flange 24 serving to hold the ring 21 concentric with respect to the stud 11.

Against the outer face of disk 22 is positioned a ring 25 which is a counterpart of ring 21, an annular shoulder on disk 22 serving to hold this ring concentric with respect to stud 11.

Positioned with its inner face in engagement with the outer face of ring 25 is a plate or disk 26 which is inclusive of an inwardly directed marginal stiffening flange 27 having projections 28 formed thereon extending into slots or recesses 29 formed in disk 18, whereby said disks are connected together for unitary rotation and whereby they may partake independently of movement longitudinally of stud 11.

In the outer face of disk 26, which is at all times free to rotate relative to stud 11, is a series of arcuate recesses 30 which are formed of greater depth intermediately than at their ends, whereby outwardly divergent cam surfaces 31 and 32 are produced at the bottoms of said recesses. In similar manner a corresponding number of arcuate recesses 33 are formed in the inner face of a stiff, preferably metallic, plate or disk 34, which disk, like disk 26, is at all times free to rotate relative to stud 11, the cam surfaces 35, 36 produced at the bottoms of the recesses 33 in this disk diverging inwardly. Disk 34 overlies disk 26 and within each related pair of recesses 30 and 33 formed respectively in said disks 26, 34, is arranged a ball or other suitable form of cam follower 37.

Against the outer face of disk 34 is positioned a friction ring 38 which is or may be a duplicate of friction rings 21 and 25, the outer face of this ring 38 being in engagement with the inner face of a stiff, preferably metallic, plate or disk 39 which is substantially a counterpart of disk 22, and like disk 22 is inclusive of a marginal flange 40 serving to hold ring 38 concentric therewith and has splined connection with stud 11 whereby it may slide longitudinally, but may not rotate relative to said stud.

Threaded on the outer end of stud 11 is a nut 41 and between this nut and the disk 39 is arranged an expansion coil spring 42 which constantly urges the several disks and rings aforementioned into intimate contact with one another, the effective strength of said spring being capable of regulation as is obvious by adjustment of nut 41.

A suitable cover 43 for all of the parts disposed outwardly of disk 18 is detachably secured to said disk by suitable fasteners 44.

In applying my shock absorber as described in the foregoing to a pair of spring connected elements such for example as the chassis 45 and axle 46 of a motor vehicle, the base or mounting plate 10 is bolted or otherwise secured rigidly to one of said elements, to the chassis for example, and the arm 20 of disk 18 is connected with the other of said elements, to the axle for example, as by means of a link 47 as shown in Figure 1 of the drawings. As a consequence it is manifest that upon movement of the chassis towards the axle, arm 20 and disk 18 integral or otherwise rigid therewith will be caused to rotate clockwise as viewed in Figure 1, resulting in corresponding rotation being imparted to disk 26 because of the projections 28 thereon engaging in the slots or recesses 29 in disk 18. The friction between disk 34 and ring 38 and between said ring and the non-rotatable disk 39 obviously being greater than the friction between the balls 37 and the disks 26 and 34, the tendency of disk 34 is to remain stationary during rotation of disk 26, so that correspondingly inclined cam surfaces such, for example, as surfaces 31 and 36 of each related pair of recesses 30, 33 cooperate with their related ball 37 to force the disks 26 and 34 apart, whereby the spring 42 is compressed and the pressure between the respective non-rotatable disks and rotatable friction rings is increased, thus increasing the frictional resistance to rotation of arm 20 and as a consequence causing downward movement of the chassis to be buffed. On the other hand, when downward movement of the chassis ceases and rebound movement of the suspension spring 48 occurs with consequent upward movement of the chassis relative to the axle, link 47 exerts a downward pull on arm 20 causing disks 18 and 26 to rotate counter-clockwise, the other two correspondingly inclined cam surfaces; viz, 32 and 35 of each related pair of recesses 30, 33 in the disks 26, 34, respectively, then becoming effective in the same manner as just described in respect to cam surfaces 31, 36 to compress spring 42, force the friction disks and rings more tightly together and thus check the rebound movement.

Since spring 42 becomes progressively stronger as it is compressed it follows that both in buffing compressive movements and in checking rebound movements of the suspension spring 48 my improved shock absorber operates with increasing intensity as the movements of spring 48 increase, which characteristic may be enhanced, if desired, by imparting to some or all the cam surfaces 31, 32, 35, 36 variable leads, that is, increasing their angle of slope towards their outer ends, so that greater compression of spring 42 per unit of relative rotary movement between the disks 26, 34 will be had as the balls 37 near the ends of their related cam surfaces than when they move relative to the intermediate portions of said surfaces.

Since the disks 26 and 34 are at all times capable of rotation relative to stud 11 it follows that if the disks 18 and 26 should be subjected to rotary movement in either direction in excess of the movement required to cause any given ball 37 to abut the opposite ends of any related pair of recesses 30, 33 as shown in Figures 5 and 6, one or the other or both of the disks 26 and 34 may yield and thus avoid damage to or breakage of any of the parts of the device due to such excessive movement.

Although I have illustrated in the present specific embodiment of my invention four friction rings cooperating with six friction disks, it is manifest that the number of rings and disks may either be increased or decreased. Furthermore, it is apparent that various other modifications of the structure described in the foregoing may be resorted to within the spirit and scope of my invention as defined in the appended claims. For example, as shown in Figures 7 and 8, the cam surfaces aforementioned may be formed on members 48 separate from and detachably interfitted, as shown with the disks 26, 34, or, as shown in Figures 15 and 16, only one of said disks may be provided with cam surfaces, either in the manner of Figure 4 or Figure 7, for cooperation either with a ball or with a protuberance 49 formed integrally with the other of said disks.

I claim:

1. A shock absorber comprising a support, a pair of plates mounted on said support each for movement in the plane thereof and at least one of them for movement in a direction perpendicular to its plane, friction elements cooperating respectively with the outer faces of said plates and resisting movement of said plates in the planes thereof, means for connecting said support to one of a pair of resiliently connected elements, means for connecting one of said plates to the other of said resiliently connected elements whereby relative movement between said elements relatively moves said plate in the planes thereof, cooperating cam and cam follower means between said plates whereby movement of either of said plates in the plane thereof serves to force said plates apart, and resilient means constantly exerting force against at least one of said friction elements and adapted to be compressed by relative separating movement of said plates.

2. A shock absorber comprising a support, a pair of disks mounted on said support each for rotation and at least one of them for axial movement, friction elements cooperating with the outer faces of said disks, respectively, resisting rotation thereof, means for connecting said support to one of a pair of resiliently connected elements, means for connecting one of said disks to the other of said elements whereby relative movement between said elements relatively rotates said disks, cooperating cam and cam follower means between said disks whereby relative rotation of said disks serves to force them apart, and resilient means constantly exerting force against at least one of said friction elements and adapted to be compressed by relative separating movement of said disks.

3. A shock absorber comprising a stud adapted to be secured rigidly to one of a pair of resiliently connected elements, a pair of disks each of which is rotatable and at least one of which is longitudinally movable relative to said stud, means for connecting one of said disks to the other of said resiliently connected elements whereby relative movement between said elements serves to relatively rotate said disks, a third disk non-rotatable and longitudinally movable with respect to said stud frictionally resisting rotation of one of said first pair of disks, an expansion spring acting through said third disk to force said first pair of disks towards one another, and means between said first pair of disks effective to force them apart against the force of said spring when they are relatively rotated.

4. A shock absorber comprising a stud adapted to be secured rigidly to one of a pair of resiliently connected elements, a disk rigid with said stud, a disk rotatable on said stud adapted for connection with the other of said elements whereby relative movement between said elements serves to impart rotation to said second mentioned disk, friction material between the adjacent faces of said disks, a third disk, a connection between said second and said third disk whereby rotation of the former rotates the latter, a fourth disk between said second and third disks non-rotatable and longitudinally movable with respect to said stud, friction material between said fourth disk and each of said second and third disks, and means whereby said disks are forced towards one another upon rotation of said second mentioned disk.

5. A shock absorber comprising a stud adapted to be secured rigidly to one of a pair of resiliently connected elements, a disk rigid with said stud, a disk rotatable on said stud adapted for connection with the other of said elements whereby relative movement between said elements serves to impart rotation to said second mentioned disk, friction material between the adjacent faces of said disks, a third disk, a connection between said second and said third disk whereby rotation of the former rotates the latter, a fourth disk between said second and third disks non-rotatable and longitudinally movable with respect to said stud, friction material between said fourth disk and each of said second and third disks, a spring, and means reacting through said spring to force said disks towards one another upon rotation of said second mentioned disk.

EDWARD J. GULICK.